(12) United States Patent
Lauvergne et al.

(10) Patent No.: US 7,630,893 B2
(45) Date of Patent: Dec. 8, 2009

(54) TRANSCRIPTION RULE BASE ENRICHMENT

(75) Inventors: Muriel Lauvergne, Trebeurden (FR); Joseph Allemandou, Lannion (FR); Celine Ance, Ile Grande (FR)

(73) Assignee: France Telecom, Paris (FR)

( * ) Notice: Subject to any disclaimer, the term of this patent is extended or adjusted under 35 U.S.C. 154(b) by 614 days.

(21) Appl. No.: 11/371,920

(22) Filed: Mar. 10, 2006

(65) Prior Publication Data

US 2006/0212292 A1 Sep. 21, 2006

(30) Foreign Application Priority Data

Mar. 16, 2005 (FR) .................... 05 50671

(51) Int. Cl.
*G10L 15/26* (2006.01)
(52) U.S. Cl. ..................... 704/235
(58) Field of Classification Search ............ 704/235
See application file for complete search history.

(56) References Cited

U.S. PATENT DOCUMENTS 6,208,964 B1 * 3/2001 Sabourin ............. 704/244
6,578,007 B1 * 6/2003 Howes et al. ............. 705/9
2004/0064317 A1 * 4/2004 Othmer et al. ............. 704/260

OTHER PUBLICATIONS

Christoph Draxler; "WWWTranscribe—A Modular Transcription System Based on the World Wide Web," ESCA, pp. 1691-1694.
Janez Kaiser et al., "The SpDatLabel Transcription Tool," http://www.dsplab.uni-mb.si/Clanki/janez/granada98_1.pdf.

* cited by examiner

*Primary Examiner*—Pankaj Kumar
*Assistant Examiner*—Gautam Sharma
(74) *Attorney, Agent, or Firm*—Lowe Hauptman Ham & Berner, LLP

(57) ABSTRACT

In a transcriber terminal, a module transcribes a trace stored in a trace database, another module validates the transcription of the transcribed trace by applying transcription rules and, if the transcribed trace is invalidated, a central unit transmits a control message including an identifier of the transcribed trace to an administrator terminal. The administrator terminal includes a module for checking if the invalidated transcribed trace must be accepted as a validated transcribed trace and a module for adding a transcription rule to a transcription rule database in order for the invalidated transcribed trace subsequently to be considered as a transcribed trace validated in the validation step.

10 Claims, 2 Drawing Sheets

TRANSCRIPTION RULE BASE ENRICHMENT

RELATED APPLICATIONS

The present application is based on, and claims priority from, French Application Number 0550671, filed Mar. 16, 2005, the disclosure of which is hereby incorporated by reference herein in its entirety.

BACKGROUND OF THE INVENTION

1. Field of the Invention

The present invention relates to the semi-automatic enrichment of a database containing transcription rules for validating transcribed traces. It also relates to checking trace transcription.

2. Description of the Prior Art

A known method for transcribing traces semi-automatically employs validation of transcribed traces by application of transcription rules. No transcription rule enrichment mechanism is proposed. There is provided only the facility for a user to be prompted to ignore a new element in or to add a new element to a lexicon of words or a list of acoustic events or symbols. Accordingly, validation by transcription rules remains imperfect. The only way for the transcription rules to evolve imposes an additional workload on an expert transcriber and thus reduces the productivity of the expert transcriber.

OBJECT OF THE INVENTION

An object of the present invention is to enrich a transcription rule database in order to improve transcribed trace validity and thereby to enhance trace transcription quality without having recourse to expert transcribers.

SUMMARY OF THE INVENTION

Accordingly, a method for enriching a transcription rule database of a first database management server, comprising in a transcriber terminal connected to the first server a step of transcribing a trace stored in a second database management server connected to the transcriber terminal into a transcribed trace stored in the second server, and a step of validating the transcribed trace by applying transcription rules stored in the transcription rule database. The method further includes the following steps:

transmitting a control message including an identifier of the transcribed trace from the transcriber terminal to an administrator terminal that is connected to the first and second servers if the transcribed trace is invalidated, checking in the administrator terminal whether the invalidated transcribed trace corresponding to the identifier transmitted must be accepted as a validated transcribed trace, and constructing a transcription rule and adding it to the transcription rule database in order for said invalidated transcribed trace thereafter to be considered as a transcribed trace validated in the validation step.

The invention also provides a system for enriching a transcription rule database, comprising a first server for transcription rule database management, a second server for database management and a transcriber terminal connected to the first and second servers. The transcriber terminal includes means for transcribing a trace stored in the second server into a transcribed trace stored in the second server and means for validating the transcription of the transcribed trace by applying transcription rules stored in the transcription rule database. The system is characterized in that it comprises:

means in the transcriber terminal for transmitting a control message including an identifier of the transcribed trace to an administrator terminal connected to the first and second servers if the transcribed trace is invalidated, means in the administrator terminal for checking whether the invalidated transcribed trace must be accepted as a validated transcribed trace, and means in the administrator terminal for constructing a transcription rule and adding it to the transcription rule database in order for said invalidated transcribed trace thereafter to be considered as a transcribed trace validated in the validation step.

Thus in administrator terminals, the invention advantageously checks traces transcribed by the transcriber terminals and in this way enhances the reliability and relevance of the validity of the transcribed traces.

Another advantage of the invention is that, since a transcription rule is added by an administrator terminal and not by a transcriber terminal, it enriches a database with transcription rules without slowing down the work of transcription at the transcriber terminals. Consequently, a transcriber terminal can carry on transcribing without concerning itself with checking the transcribed traces.

Thanks to the invention, transcribers at their transcriber terminals benefit from the dynamic addition of transcription rules and dynamic evolution of the existing transcription rules.

BRIEF DESCRIPTION OF THE DRAWINGS

Other features and advantages of the present invention will be apparent more clearly from the reading of the following description of several preferred embodiments of the invention, given by way of nonlimiting examples and which reference to the corresponding accompanying drawings in which.

DESCRIPTION OF THE PREFERRED EMBODIMENTS

Generally speaking, the invention described hereinafter relates to transcription of traces by users referred to as transcribers, who are a priori not experts, working at respective transcriber terminals.

A trace may be an audio trace consisting of an audio segment of an audio signal to be transcribed into a transcribed audio trace that is made up of a text message resulting from manual transcription of the audio trace. An audio trace includes one or more successive words or groups of words separated by spaces that may include acoustic events. In a conversation between two speakers or a meeting involving several speakers, an audio trace comes from only one speaker. A trace may also be a transcribed trace as defined above, made up of a text message resulting, for example, from a text of an electronic message or from speech recognition of an audio trace in an audio signal, and is to be transcribed into a modified transcribed trace by modifying the text message constituting the trace. A trace may further be a transcribed trace or a modified transcribed trace to be transcribed into an annotated transcribed trace or an annotated modified transcribed trace, which is made up of the trace and an annotation that complements the meaning of the trace by means of a remark relating to the trace that is difficult to classify.

A transcribed trace comprises words, acoustic events, symbols or signs, for example.

Transcription rules are, for example, correspondences between words and series of words of the transcribed trace and words and series of words in selected lexicons LM and acoustic events and symbols in selected lists L1 and L2. The lexicons and lists and the transcription rules can be modified only by an administrator. The transcription rules may equally be writing rules: for example, an acoustic event of long type is necessarily represented by a start marker and an end marker, such as markers [music] and [-music].

An acoustic event included between words or groups of words in a trace is a specific sound, for example a slammed door, a barking dog, a sneeze, a mouth sound, a ringing sound, etc. An acoustic event is defined by a type, a unique name, a display name and a start marker, where applicable an end marker, a regular expression and a description. An acoustic event is of either long type or short type. An acoustic event of long type comprises an end marker and a regular expression, in contrast to an acoustic event of short type. An event of short type is associated with a one-off acoustic event such as a sneeze. An event of long type is associated with an event during which other sounds may occur, such as a music acoustic event.

A symbol is an abbreviation of a word or an expression and is defined by a symbol identifier from which a marker is formed. One example of a (symbol, word or expression, identifier) triplet is: (cda, Côtes-d'Armor, @cda); (PR, Paris Region, @RP); (ft, France Télécom, @ft).

Figure 1:
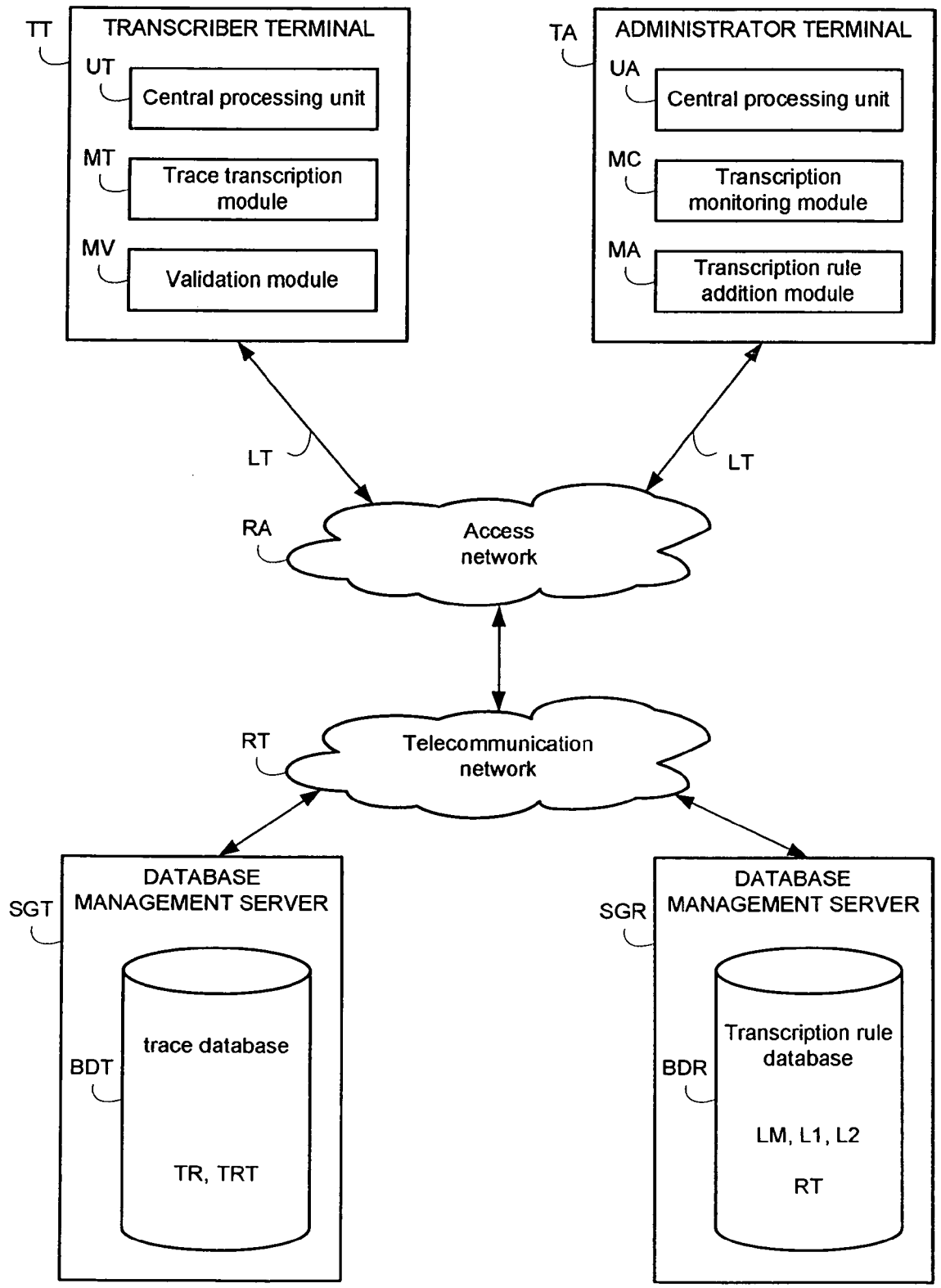
FIG. 1 is a block schematic of a preferred embodiment of a system of the invention for semi-automatically enriching a transcription rule database.

Referring to FIG. 1, the enrichment system using the preferred embodiment of the enrichment method of the invention comprises a first database management server SGR for a transcription rule database, a second database management server SGT for a database of traces to be transcribed and transcribed traces, one or more transcriber terminals TT and one or more administrator terminals TA. Software components that relate to functions of the invention are installed in the transcriber terminals TT and administrator terminals TA, which are personal computers, for example.

The server SGR comprises a transcription rule database BDR in which are stored transcription rules, lexicons LM of words, one or more lists L1 of acoustic events and a list L2 of symbols.

The server SGT manages a database BDT of audio traces and/or transcribed traces. Initially, either audio traces are to be transcribed manually into transcribed traces or traces already transcribed by a speech recognition system are to be transcribed into modified transcribed traces.

The database management servers SGT and SGR are connected to an Internet type high bit rate telecommunication network RT. The servers SGT and SGR and the terminals TT and TA communicate via the telecommunication network RT and respective access networks RA.

Each terminal TT, TA is connected to the respective access network RA via a respective telecommunication link LT. The link LT and the network RA may conventionally be a telephone line and the public switched telephone network PSTN connected to the telecommunication network RT. In other variants, the telecommunication link LT is a digital subscriber line (xDSL) or an integrated services digital network (ISDN) line connected to the corresponding access network. The terminals TT and TA are personal computers connected via modems directly to the links LT, for example. The transcriber terminals, the administrator terminals and the access networks are not limited to the above examples and may consist of other terminals and access networks known in the art.

In one variant, the database management servers SGT and SGR are near the transcriber terminals TT and administrator terminals TA or only the administrator terminals TA, and a link LT is a conventional cable link, for example, or a short-range radio link.

In another variant, the administrator terminal TA is lumped together with one of the database management servers SGT and SGR.

In another variant, a transcriber terminal TT comprises a trace database and a transcription rule database that are regularly synchronized with the database management servers SGT and SGR, respectively.

In another variant, the database management servers are combined in a single database management server.

The transcriber terminal TT used by a transcriber includes a central processing unit UT including an interface for communicating with the respective access network RA, a trace transcription module MT, a validation module MV and a transcription interface (not shown) including an electro-acoustic transducer, such as a loudspeaker associated with a sound card, or any other means of reproducing an audio signal, a keyboard and a display screen.

The administrator terminal TA used by an administrator of the enrichment system of the invention comprises a central processing unit UA including an interface for communicating with the respective access network RA, a transcription monitoring module MC, a transcription rule addition module MA, a keyboard and a display screen (not shown).

In one variant, the administrator terminal TA is an administrator server including the trace database BDT and the transcription rule database BDR.

Figure 2:
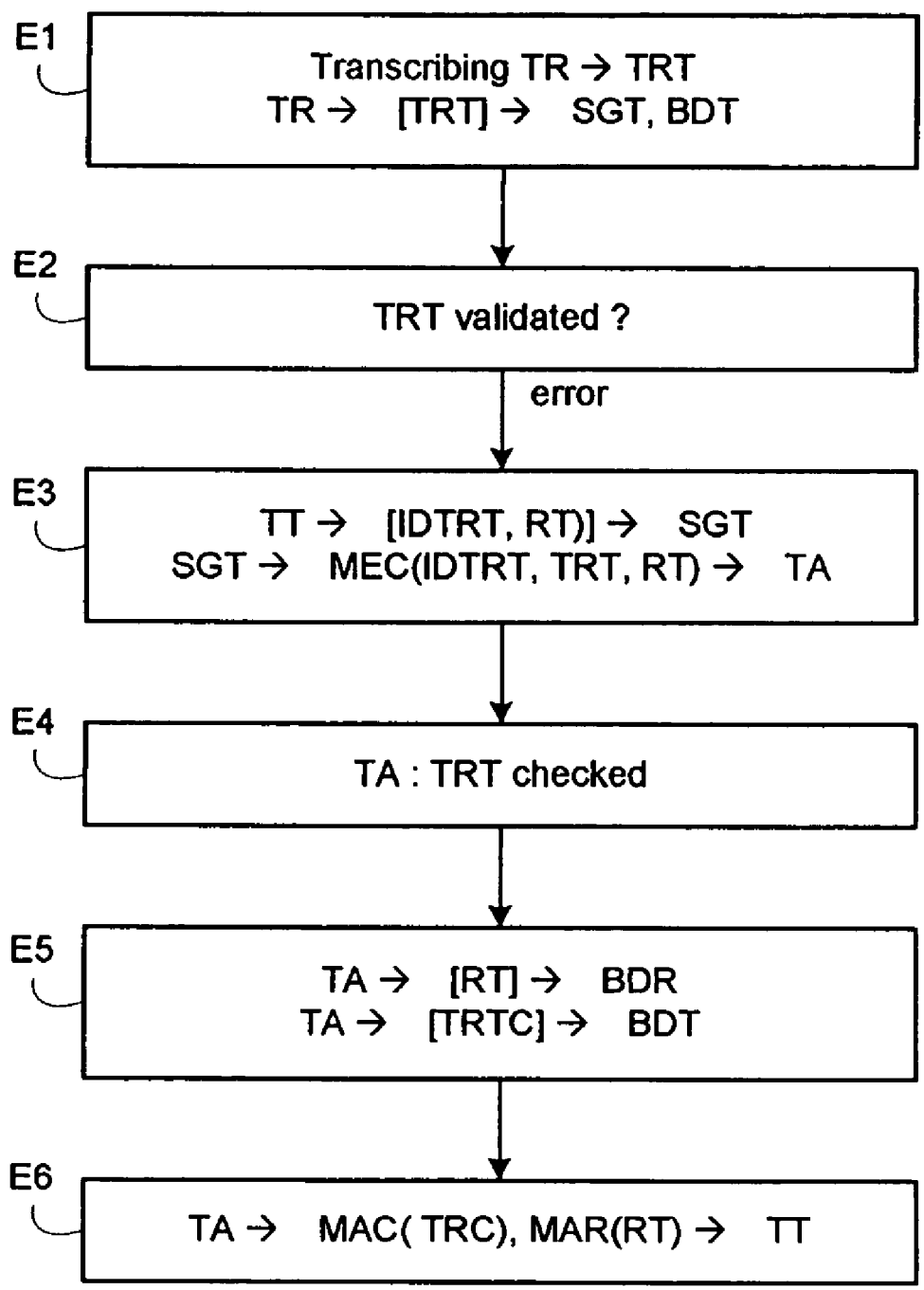
FIG. 2 shows an algorithm of a preferred embodiment of a method of the invention for semi-automatically enriching a transcription rule database.

The enrichment method of the invention comprises steps E1 to E6 shown in FIG. 2.

Initially, and depending on the context of the traces to be transcribed, an administrator defines transcription rules to be used to validate the transcription of traces transcribed by transcriber terminals. For example, the administrator defines lexicons of words and writing rules to be used by the validation module MV of a transcriber terminal.

In the step E1, a transcriber terminal TT receives a trace TR previously stored in the trace database management server SGT and the transcriber working at the terminal TT transcribes it into a transcribed trace TRT using the transcription interface and the trace transcription module MT. The transcription module MT forwards the transcribed trace TRT to the server SGT, which stores the transcribed trace TRT in the trace database BDT. Assuming that the trace TR to be transcribed is "I would like to make an appointment with the doctor, er, the closest to my home . . . near Danton street", the transcription result TRT is, for example: "I would like to make an appointment with the doctor, er, the closest to my home * near Danton street".

In the step E2, the validation module MV of the transcriber terminal TT validates the transcribed trace TRT by applying the initially defined transcription rules stored in the transcription rule database BDR. In this example of the step E1, if the family name "Danton" is not included in any of the lexicons L1 to which the transcriber at the terminal TT has access, and if a transcription rule imposes the appending of the asterisk symbol "*" to a preceding transcribed word, such as "home" the validation module indicates a lexical error in relation to the word "Danton" and a writing error in relation to the insertion of the asterisk.

In the step E3, the central unit UT of the transcriber terminal TT sends a control message MEC including the transcribed trace TRT and an identifier IDTRT of the transcribed trace to the administrator terminal TA if the transcribed trace is invalidated, in order to prompt the administrator terminal to check the transcribed trace. The control message is sent either automatically or semi-automatically and subject to the agreement of the transcriber at the terminal.

In one variant, the control message MEC includes at least one added transcription rule RT proposed by the transcriber working at the terminal TT to the administrator working at the terminal TA. The proposal is to add a word to a lexicon or to improve an existing transcription rule, for example. In this example of the step E1, the transcriber proposes adding the word "Danton" to a lexicon and modifying the transcription rule relating to the asterisk, which consists in the option not to append an asterisk to the preceding transcribed word.

To be more precise, the step E3 of transmitting the control message MEC comprises a step of transmitting the identifier IDTRT of the transcribed trace, where appropriate with a modified rule constituting an added transcription rule, from the transcriber terminal TT to the trace database management server SGT if the transcribed trace is invalidated, and a step of transmitting the control message MEC(IDTRT, TRT, RT) from the server SGT to the administrator terminal TA. Thus the server SGT serves as an intermediary between the transcriber terminal TT and administrator terminal TA. The control message MEC is stored in the trace database BDT. The central unit UA of the administrator terminal TA extracts the content of the control message MEC transmitted by the transcriber terminal TT to be processed by the control module MC.

In the step E4, the control module MC in the administrator terminal TA checks the transcribed trace TRT corresponding to the transmitted identifier IDTRT. The control module MC displays the transcribed trace to be checked as a function of the identifier of the transmitted trace, and where appropriate the proposal of the transcriber. The administrator checks the trace and deduces from it whether the transcribed trace is acceptable, and therefore valid despite the fact that it includes errors, or whether the transcribed trace is invalidated and must be accepted as a validated transcribed trace. In this example of the step E1, the module MC checks the trace transcribed by the transcriber terminal TT. Given the transcription rules in the database BDR, the administrator decides that the word "Danton" should be added to a lexicon relating to addresses and that the transcription rule relating to the asterisk should be modified. For example, the following rule relating to the asterisk "WordAsterisk=Word+"*"" is modified to yield the following rule {Word Asterisk=Word+ "*"|Word+"*"}, where the vertical bar designates a transcription.

In the step E5, the addition module MA in the terminal TA constructs a transcription rule RT and adds it to the transcription rule database BDR if, after checking, the transcribed trace TRT is considered to be invalidated, in order for the invalidated transcribed trace to be deemed to be a validated transcribed trace in any subsequent transcribed trace validation step. The step E5 is executed either automatically or semi-automatically by the administrator at the terminal TA, who adds a word to a lexicon or adds or modifies a transcription rule. For automatic implementation, the addition module MA can analyze the transcribed trace after checking in order to extract the portion of the trace that is not valid with reference to the pre-existing rules and to deduce from that portion a transcription rule validating it. Once the rule relating to the asterisk, for example, has been modified, the validation modules of the transcriber terminals TT accept the syntax of the space between a transcribed word and an asterisk.

When, after checking, the transcribed trace is considered to be invalidated, the addition module MA corrects it to yield a corrected transcribed trace TRTC, stores it and forwards it to the trace database management server SGT, which stores it in the trace database BDT.

In the step E6, the administrator terminal TA sends the transcriber terminal TT a correction warning message MAC containing the corrected transcribed trace TRTC and/or the administrator terminal TA sends at least to the transcriber terminal TT a rule warning message MAR including the added or modified transcription rule RT. The correction warning message MAC is generally transmitted only to the transcriber terminal concerned, whereas the rule warning message MAR is broadcast by the administrator terminal TA to all the transcriber terminals so that all the transcribers become aware of it. In this example of the step E1, the rule warning message MAR for adding the rule relating to the asterisk may be "The rule relating to the asterisk has been modified, here is its new definition: Word Asterisk=Word+"*"|Word+"*"".

The warning messages MAR are generally transmitted to the terminals via a server such as the transcription rule database management server SGR.

The invention described here relates to a method and a system for semi-automatically enriching a transcription rule database. In a preferred embodiment of the invention, the steps of the method are determined by the instructions of a first computer program incorporated in a first data processing device such as an administrator terminal TA and a second computer program incorporated in a second data processing device such as a transcriber terminal TT. The second program comprises program instructions which, when said second program is loaded into and executed in the second device, transcribe a trace TR stored in the trace database management server SGT connected to the transcriber terminal TT and to the administrator terminal TA into a transcribed trace TRT, store the transcribed trace in the server SGT and validate the transcribed trace by applying transcription rules stored in the transcription rule database BDR. The first computer program comprises program instructions which, when said program is loaded into and executed in the second device, process (E3) a control message including an identifier IDTRT of the transcribed trace TR and transmitted by the transcriber terminal TT if the transcribed trace is invalidated, check (E4) whether the invalidated transcribed trace corresponding to the transmitted identifier must be accepted as a validated transcribed trace, and construct (E5) a transcription rule and add it to the transcription rule database BDR in order for said invalidated transcribed trace subsequently to be considered as a transcribed trace validated by the validation instructions.

Consequently, the invention applies equally to a computer program adapted to implement the invention, in particular a computer program on or in an information medium. The program may use any programming language and be in the form of source code, object code or an intermediate code between source code and object code, such as in a partially compiled form, or in any other form desirable for implementing the method of the invention.

The information medium may be any entity or device capable of storing the program. For example, the medium may include storage means or a recording medium, such as a ROM, for example a CD-ROM or a microelectronic circuit ROM, or magnetic recording means, for example a diskette (floppy disk) or hard disk.

Furthermore, the information medium may be a transmissible medium such as an electrical or optical signal, which may be routed via an electrical or optical cable, by radio or by other means. The program according to the invention may in particular be downloaded over an Internet type network.

Alternatively, the information medium may be an integrated circuit in which the program is incorporated and which is adapted to execute the method of the invention or to be used in the execution of the method of the invention.

What we claim is:

1. Method of enriching a transcription rule database of a first database management server, said method including the following steps:

in a transcriber terminal connected to said first database management server, transcribing a trace stored in a second database management server connected to said transcriber terminal into a transcribed trace to be stored in said second database management server, and validating said transcribed trace by applying transcription rules stored in said transcription rule database, transmitting a control message including an identifier of said transcribed trace from said transcriber terminal to an administrator terminal that is coupled to said first database management server and second database management server if said transcribed trace is invalidated, checking in said administrator terminal whether the invalidated transcribed trace corresponding to said identifier transmitted must be accepted as a validated transcribed trace, and constructing in said administrator terminal a transcription rule and adding it to said transcription rule database in order for said invalidated transcribed trace thereafter to be considered as a transcribed trace validated in the validating step.

2. Method according to claim 1, including a step of correcting and storing said transcribed trace into a corrected transcribed trace if, after checking, said transcribed trace is considered to be invalidated.

3. Method according to claim 2, wherein said administrator terminal transmits a correction warning message including said corrected transcribed trace to said transcriber terminal.

4. Method according to claim 1, wherein said administrator terminal transmits a rule warning message including the added transcription rule at least to said transcriber terminal.

5. Method according to claim 1, wherein the added transcription rule includes an adding of a word in a lexicon.

6. Method according to claim 1, wherein the added transcription rule is a modified rule.

7. Method according to claim 1, wherein the step of transmitting said control message includes transmitting said identifier of said transcribed trace from said transcriber terminal to said second database management server if said transcribed trace is invalidated, and transmitting said control message from said second database management server to said administrator terminal.

8. Method according to claim 1, wherein said control message transmitted from said transcriber terminal to said administrator terminal includes at least one proposal in respect of a transcription rule.

9. System for enriching a transcription rule database, comprising:

a first server for transcription rule database management, a second server for database management, a transcriber terminal connected to the first server and second server and including means for transcribing a trace stored in the second server into a transcribed trace stored in the second server, means for validating the transcription of the transcribed trace by applying transcription rules stored in said transcription rule database, and means for transmitting a control message including an identifier of the transcribed trace to an administrator terminal if the transcribed trace is invalidated, said administrator terminal being connected to the first server and second server and including means for checking whether the invalidated transcribed trace must be accepted as a validated transcribed trace, and means for constructing a transcription rule and adding it to said transcription rule database in order for said invalidated transcribed trace thereafter to be considered as a transcribed trace validated in the validation step.

10. A computer readable storage medium or a memory storing a computer program adapted to be used in an administrator terminal to enrich a transcription rule database of a first database management server connected to the administrator terminal and to a transcriber terminal, the transcriber terminal including means for transcribing a trace stored in a second database management server connected to the transcriber terminal and to the administrator terminal into a transcribed trace stored in the second server and means for validating the transcribed trace by applying transcription rules stored in the transcription rule database, said program including instructions which, when the program is loaded into and executed in said administrator terminal:

process a control message including an identifier of the transcribed trace and transmitted from the transcriber terminal if the transcribed trace is invalidated, check whether the invalidated transcribed trace corresponding to the transmitted identifier must be accepted as a validated transcribed trace, and construct a transcription rule and add it to said transcription rule database in order for said invalidated transcribed trace subsequently to be considered as a transcribed trace validated in said validating means.

* * * * *